United States Patent Office 3,636,064
Patented Jan. 18, 1972

3,636,064
ANTHRAQUINONE REACTIVE DYES
Seiji Hotta, Minoo-shi, Tomio Nakano, Takarazuka-shi, Hirohito Kenmochi, Toyonaka-shi, and Takashi Akamatsu, Ashiya-shi, Japan, assignors to Sumitomo Chemical Company, Ltd., Osaka, Japan
No Drawing. Filed Mar. 11, 1968, Ser. No. 711,900
Int. Cl. C09b 1/34
U.S. Cl. 260—374                        4 Claims

ABSTRACT OF THE DISCLOSURE

Clear reddish blue or greenish blue anthraquinone reactive dyes,

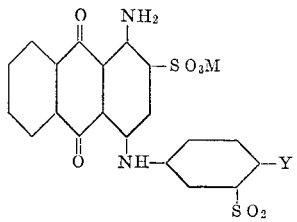

wherein
X: —CH=CH$_2$ or —CH$_2$CH$_2$OSO$_3$M wherein M is Na, K or H and
Y: an alkyl group, an alkoxy group, a hydroxy group, a halogen atom, an acylamino group or an alkylamino group.

---

The dyes are prepared by condensing an amine compound,

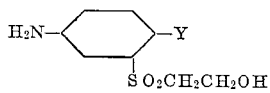

with 1-amino-4-bromoanthraquinone-2-sulfonic acid, to obtain a condensation product, and esterifying the condensation product with sulfuric acid or further treating the ester with an alkali.

The present invention relates to novel anthraquinone reactive dyes and method for producing the same and method for dyeing fibrous materials by use of the same.

More particularly, the present invention pertains to novel anthraquinone reactive dyes represented by the formula,

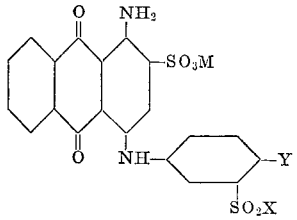

wherein X represents a group of the formula,

—CH=CH$_2$ or CH$_2$CH$_2$OSO$_3$M wherein M is Na, K or H and Y represents an alkyl group having up to 4 carbon atoms, an alkoxy group having up to 4 carbon atoms, a hydroxy group, a halogen atom, an acylamino group having up to 4 carbon atoms or an alkylamino group having up to 4 carbon atoms.

It is well known that the groups —SO$_2$—CH=CH$_2$ and —SO$_2$—CH$_2$—CH$_2$OSO$_3$H are functional groups of so-called reactive dyes, for dyeing fiber materials.

However it has been difficult to dye fibrous materials with known dyes having such functional groups to obtain clear reddish blue to greenish blue hue.

The present inventors examined the relationship between structure and properties of this kind of dyes to find that the dyes represented by the above-mentioned Formula I are not only excellent in lightfastness and wetfastness but also are prominent in clarity of hue of dyeings.

One object of the present invention is to provide novel anthraquinone reactive dyes. Another object of the present invention is to provide a method for producing the anthraquinone reactive dyes. The other object of the present invention is to provide a method for producing intermediate compounds for the above anthraquinone reactive dyes. Further, the other object of the present invention is to provide a method for dyeing fibrous materials with the anthraquinone reactive dyes. Still further, the other object of the present invention is to provide fibrous materials dyed with the anthraquinone reactive dyes. Other objects of the present invention will be apparent from the following description.

The dyes of the present invention, as represented by the above-mentioned formula, are novel compounds. They are prepared by reacting an amine compound represented by the Formula II,

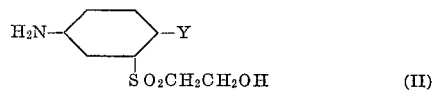   (II)

wherein Y has the same meanings as defined above, with 1-amino-4-bromoanthraquinone-2-sulfonic acid in the presence of an acid binding agent and a copper-catalyst according to a conventional manner, to obtain a condensation product represented by the formula,

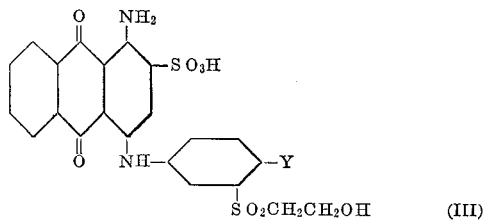   (III)

wherein Y has the same meanings as defined above, and esterifying the condensation product (III) with sulfuric acid at the hydroxy group of the hydroxyethyl, whereby an ester, where X is —CH$_2$—CH$_2$—O—SO$_3$H, which is one of the dyes of the present invention, is obtained. The ester is further treated with an alkali, whereby a vinylsulfone compound, where X is —CH=CH$_2$, is obtained.

Examples of alkyl group represented by Y include methyl, ethyl, propyl, n-butyl and iso-propyl.

Examples of alkoxy group represented by Y include methoxy, ethoxy and n-butoxy.

Examples of halogen represented by Y include chlorine and bromine.

Examples of acylamino group represented by Y include acetamino and propionylamino group.

Examples of alkylamino group represented by Y include methylamino, ethylamino and n-butylamino group.

In the reaction of the amine compound (II) with 1-amino-4-bromoanthraquinone-2-sulfonic acid, water or a mixture of water and organic solvent such as alcohols or dimethylformamide is used as a reaction medium, and the reaction is carried out at a temperature within a range of from 15° C. to the boiling temperature of the reaction medium employed for 1 to 20 hours. As the acid binding agent, inorganic base such as sodium hydroxide, potassium hydroxide, sodium carbonate or sodium bicarbonate is used. As the catalyst, copper or copper salt such as cupric sulfate, cuprous chloride, cuprous iodide, cupric acetate or cupric oxide is used. The product is separated from the reaction mixture by a conventional method, for example, by acidifying or salting out the reaction mixture. It is not necessary to purify the product, however, if desired, the product is purified by a conventional manner.

In the esterification of the condensation product with sulfuric acid, the condensation product is slowly added to concentrated sulfuric acid with stirring at below 30° C., and stirring is continued at the same temperature. After the completion of the reaction, the reaction mixture is poured into a large amount of ice-water to separate the ester from the reaction mixture, the precipitate is collected by filtration and dried, as a result the dye of the present invention, wherein X of the above-mentioned Formula I is —$CH_2CH_2OSO_3H$, is obtained in the form of powder or crystal.

In treating the ester thus obtained with alkali, the ester is added to a suitable amount of water containing an alkali such as sodium hydroxide, potassium hydroxide, sodium carbonate or sodium bicarbonate and the pH of the mixture is adjusted to above 7, whereby the sulfatoethyl sulfone group of the ester is converted to vinyl sulfone group. In order to separate the vinyl sulfone compound from the reaction mixture, the reaction mixture is subjected to salting out or acidifying, and the precipitate is collected by filtration and dried, so the dye of the present invention, wherein X of the above-mentioned Formula I is —$CH=CH_2$, is obtained in the form of powder or crystals.

Amine compounds represented by the Formula II and used as starting materials in the present invention can be prepared by, for example, reacting a nitrobenzenesulfinic acid compound represented by the formula,

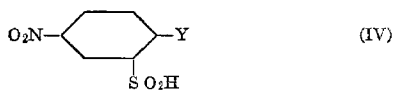 (IV)

wherein Y has the same meanings as defined above, or an acylanilidosulfinic acid compound represented by the formula,

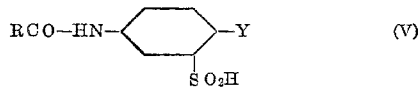 (V)

wherein R represents a lower alkyl having up to 4 carbon atoms; and Y has the same meanings as defined above, with ethylene halohydrin or ethylene oxide to obtain a hydroxyethyl sulfone compound and then reducing the nitro group or hydrolyzing the acetylamino group of the hydroxyethyl sulfone compound to obtain the amine compound.

The preparation of the amine compounds using the nitro compounds represented by the Formula IV as the starting compounds is carried out in a manner similar to that disclosed in the Specification of Japanese patent publication No. 22,767/1967.

In case acylanilidosulfinic acid compounds represented by the Formula V are used as starting compounds, first an alkali metal salt of the acylanilidosulfinic acid compound is reacted with an ethylene halohydrin such as ethylene chlorohydrin or ethylene bromohydrin or ethylene oxide in the presence of an inert solvent such as methanol, ethanol, acetone, methyl isobutyl ketone, benzene or water at a temperature of from 0° to 100° C., preferably from 40° to 70° C. with stirring to obtain a hydroxyethyl sulfone compound. During the reaction pH of the reaction mixture is maintained at 7 by neutralizing the reaction mixture with an acid such as hydrochloric acid. After completion of the reaction the hydroxyethyl sulfone compound is isolated in the form of oil or crystal. Next, the hydroxyethyl sulfone compound is hydrolyzed at the acylamino group to obtain the amine compound represented by the Formula II by a conventional manner, for example, by reacting the hydroxyethyl sulfone compound with water in the presence of an acid such as hydrochloric acid or an alkali such as sodium hydroxide.

The present dyes are in the state of a free acid or a sodium or potassium-salt. The dyes can provide cellulose fibers reddish blue or greenish blue shade in the presence of an alkali. The resultant dyed products show markedly excellent light fastness and wet fastness.

The dyes of the present invention are suitable for dyeing various fibrous materials, particularly natural cellulose fibers such as cotton or linen, viscose rayon, viscose staple fibers.

The present dyes can be applied by any of dyeing processes, such as conventional dipping, printing or padding method. Dipping method of cellulose fibers is carried out at 40° to 90° C. in the presence of an acid binding agent such as sodium bicarbonate, sodium carbonate, sodium hydroxide or sodium tertiary phosphate in a bath incorporated with inorganic salt such as sodium chloride or sodium sulfate.

Padding method is effected by applying an aqueous solution of a dye and urea to a fiber, treating the printed fiber with a chemical solution containing an acid binding agent such as sodium bicarbonate, sodium carbonate, sodium hydroxide or sodium tertiary phosphate, and then or simultaneously therewith steaming or heating the fibers at 100°–200° C.

Printing method is effected by printing a fibrous material with printing-paste which is prepared by adding the present dyes and the above-mentioned acid binding agent to a raw paste consisting of alkylcellulose or sodium arginate and thereafter steaming or heating the printed fiber at 100°–200° C. Alternatively printing method is carried out by printing the fiber with a printing-paste containing the present dye but not acid binding agent, treating the printed fiber with an acid binding agent; and then steaming or heating the same.

In case of dyeing nitrogen-containing fibers, dyeing is conventionally carried out in a neutral or acidic dyeing bath. In this case, neutralization treatment by using weak alkali such as hexamethylenediamine in the presence of nitrogen-containing nonionic or cationic surfactant, etc. is effected for level dyeing method after dyeing a fiber.

It is suitable that a dye which has not fixed on a fiber is removed from fiber for example by soaping or rinsing after dyeing.

The following examples are given to illustrate the method for preparing the novel dyes of present invention more particularly, but it is not necessary to say that the present invention is not limited to them. All the parts and percentages are by weight unless otherwise specified.

EXAMPLE 1

A mixture of 46.7 parts of sodium 1-amino-4-bromoanthraquinone-2-sulfonate (86.6%), 237 parts of water, 31.8 parts of sodium carbonate and 25.4 parts of 2-methoxy-5-aminophenyl-β-hydroxyethyl sulfone was heated at 80° C. with stirring. After obtaining a homogeneous mixture, 1.0 part of finely powdery cupric sulfate was added thereto and the mixture was heated at 80°–83° C., after the completion of the condensation the reaction mixture was subjected to acidifying, filtration and washing with 200 parts of 3% hydrochloric acid and drying to obtain the condensation product.

To 250 parts of concentrated sulfuric acid was slowly added 50 parts of the obtained condensated product at a temperature below 20° C., and after completion of the addition the mixture was stirred at 15°–20° C. for 3 hours. To a mixture of 700 parts of ice, 300 parts of water and 100 parts of potassium chloride was poured the mixture and additionally 50 parts of potassium chloride was added to salt out and the precipitate was collected by filtration. The collected precipitate was suspended in water and sodium carbonate was added thereto to adjust the suspension to pH 6 and the mixture was subject to salting out with potassium chloride, filtration and drying to obtain the dye represented by the formula,

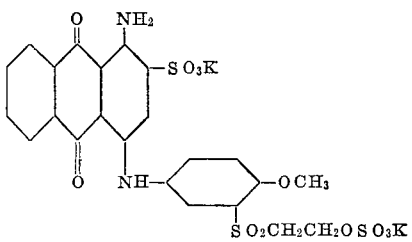

The thus obtained dye can dye cotton to a greenish blue color having excellent wet fastness, according to a dyeing process applied to a conventional reactive dye, that is, by preparing a paste containing the dye, printing the paste on a cotton padding in an alkali solution and steaming the printed cotton.

The amine compound used as the starting material was obtained by reacting p-acetanisidine sulfinic acid with ethylene oxide and hydrolyzing the resultant condensate by addition of concentrated hydrochloric acid, the amine compound had M.P. 108°–110° C.

Even when 2-ethoxy-5-aminophenyl-β-hydroxyethyl sulfone or 2-propoxy-5-aminophenyl-β-hydroxyethyl sulfone was employed in the place of 2-methoxy-5-aminophenyl-β-hydroxyethyl sulfone, there was obtained a dye giving the similar greenish blue print on a cellulose fiber as in the above.

EXAMPLE 2

A mixture of 46.7 parts of sodium 1-amino-4- bromo-anthraquinone-2-sulfonate (86.6%), 218 parts of water, 19 parts of methanol, 31.8 parts of sodium carbonate and 25.8 parts of 2-methyl-5-aminophenyl-β-hydroxyethyl sulfone was heated at 85° C. with stirring. After obtaining a homogeneous mixture, 1.0 part of cupric sulfate was added thereto, and the mixture was heated at 85°–87° C. After the completion of the reaction, the mixture was subjected to acidifying with hydrochloric acid, the precipitate was collected by filtration and mixed with 200 parts of 3%-hydrochloric acid to be purified. The thus obtained condensated product was esterified in similar manner to that in Example 1, and there was obtained a dye having the formula,

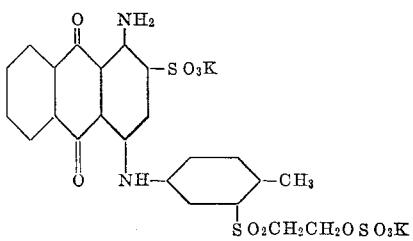

and having a blue color excellent in wet fastness on cotton.

The amine compound used as the starting material was obtained by reacting p-nitrotoluene sulfinic acid with ethylene oxide and reducing the resultant condensate with iron-powder and hydrochloric acid.

Even when 2-ethyl-5-aminophenyl-β-hydroxyethyl sulfone was used in the place of 2-methyl-5-aminophenyl-β-hydroxyethyl sulfone, there was obtained a dye capable of giving a dyed cellulose fiber having blue color. Further, when 2-chloro-5-aminophenyl-β-hydroxyethyl sulfone was used, there was obtained a dye capable of giving a dyed cellulose fiber having a reddish blue.

EXAMPLE 3

A mixture of 46.7 parts of sodium 1-amino-4-bromo-anthraquinone-2-sulfonate (86.6%), 237 parts of water, 21.2 parts of sodium carbonate, 8.4 parts of sodium bicarbonate and 23.9 parts of 2-hydroxy-5-aminophenyl-β-hydroxyethyl sulfone was heated at 80° C. with stirring. After obtaining a homogeneous mixture, 1.0 part of freshly prepared cuprous chloride was added thereto and heated at 80°–83° C. with stirring until there was not recognized the uncondensed compound by paper-chloromatogram. After completion of the reaction 237 parts of water were added and then the mixture was heated at 80° C. and subjected to heat filtration to remove insoluble matter. The filtrate was subjected to salting out by addition of 50 parts of sodium chloride, filtration and drying to obtain a dye having the formula

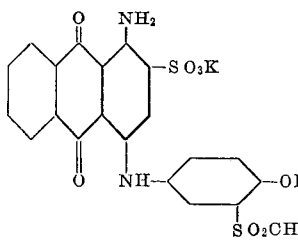

The thus obtained dye was esterified in similar manner to that in Example 1 and there was obtained a dye capable of printing cotton to greenish blue color excellent in wet fastness.

The amine compound used as the starting material was obtained by reacting p-chloro-nitrobenzene sulfinic acid with ethylene chlorohydrin and hydrolyzing of the condensation product in the presence of a strong alkali and reducing the resultant product with sodium disulfide.

Even when 2-acetylamino-5-aminophenyl - β - hydroxyethyl sulfone or 2-methylamino - 5 - aminophenyl-β-hydroxyethyl sulfone was used in the place of 2-hydroxy-5-aminophenyl-β-hydroxyethyl sulfone, there was obtained a dye capable of printing cellulose fiber to greenish blue color.

Next, the dyeing process using the dyes of the present invention will be illustrated below with reference to examples, but it is not necessary to say that the present invention is not limited to them. All the parts and percentages are by weight unless otherwise specified.

EXAMPLE 4

Two parts of the dye represented by the formula,

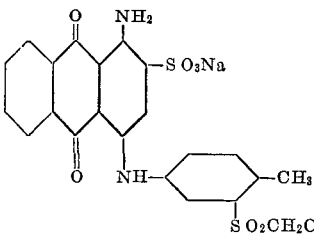

and prepared according to Example 2, was dissolved in 500 parts of water. To the solution, 20 parts of anhydrous sodium sulfate was added. The mixture was charged with 20 parts of cotton and was heated to 70° C. To the mixture, 5 parts of sodium tertiary phosphate was added and dyeing was effected at said temperature for 1 hour. Subsequently, the cotton was subjected to soaping and water-washing to obtain a dyed product having a clear blue fast to sunlight and washing.

EXAMPLE 5

One part of the dye represented by the formula

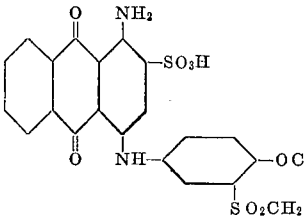

and prepared according to Example 1, and 5 parts of urea were dissolved in 50 parts of water. A cotton cloth was padded in said solution. The cloth was predried and padded in 100 parts of a chemical solution containing mixture consisting of 1 part of sodium hydroxide and 30 parts of sodium chloride and then pressed to remove the solution. Subsequently, the cotton cloth was subjected to steaming for 1-2 minutes, soaping and water-washing to obtain a dyed product having a blue color fast to sunlight and washing.

EXAMPLE 6

One part of the dye represented by the formula

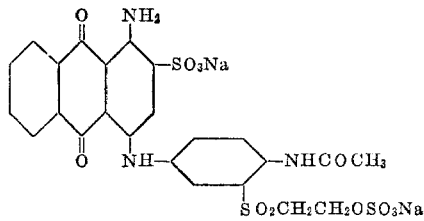

5 parts of urea and 2 parts of sodium bicarbonate were dissolved in 50 parts of water. A cotton cloth was padded in said solution was predried and was then dry-heated at 140° C. for 2 minutes. Subsequently, the cotton cloth was subjected to soaping and water-washing to obtain a dyed product having a clear greenish blue color fast to sunlight and washing.

EXAMPLE 7

Two parts of the dye represented by the formula

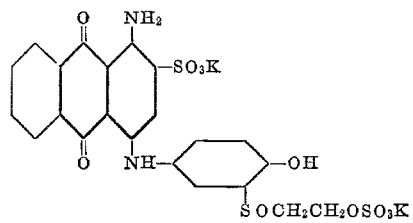

and 8 parts of urea were dissolved in 40 parts of hot water. To 50 parts of a 5% sodium alginate paste was added the solution with stirring and then the mixture was cooled and to the mixture was added 2 parts of sodium bicarbonate.

A cotton cloth was printed with said paste and the printed cotton cloth was subject to drying and steaming for 5 minutes. Subsequently, the cotton cloth was subjected to soaping and water-washing to obtain a dyed product having a blue color fast to sunlight and washing.

EXAMPLE 8

Zero point two parts of the dye, represented by the formula

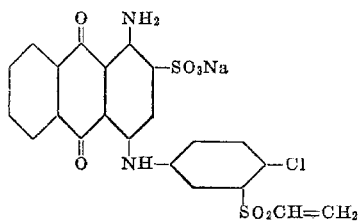

was dissolved in 200 parts of water. To the solution 0.1 part of acetic acid and 0.1 part of a nitrogen-containing noionic surfactant were added. Ten parts of wool were dipped in the solution. The temperature of the mixture was elevated to 95°-100° C. and maintained at the temperature range for 1 hour. During the dyeing 0.1 part of formic acid was added to the mixture. Subsequently, the wool was subjected to soaping and water-washing to obtain a dyed product having a blue color fast to sunlight and washing.

EXAMPLE 9

The processes of Example 4 to 8 were applied to the dyes represented by the formulae shown below to obtain dyed products having such clear hues as set forth below.

Formula      Shade

[Formula 1]    blue

[Formula 2]    blue

[Formula 3]    greenish blue

[Formula 4]    blue

What is claimed is:

1. A compound of the formula,

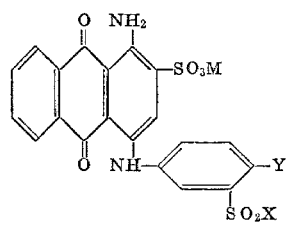

wherein X is —CH$_2$CH$_2$OSO$_3$M or —CH=CH$_2$ wherein M is Na, K or H and Y is an alkoxy group having 1 to 2 carbon atoms.

2. A compound of the formula,

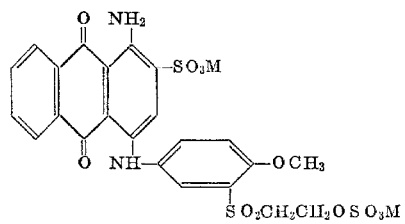

wherein M is Na, K or H.

3. A compound of the formula,

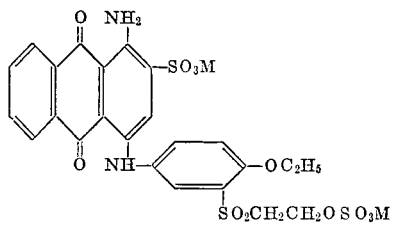

wherein M is Na, K or H.

4. A compound of the formula,

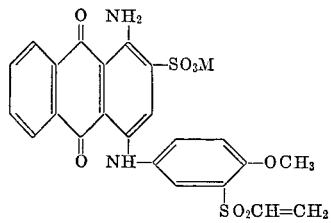

wherein M is Na, K or H.

References Cited

UNITED STATES PATENTS

| | | | |
|---|---|---|---|
| 2,657,205 | 10/1953 | Heyna et al. | 260—374 |
| 3,102,894 | 9/1963 | Lodge | 260—374 |

FOREIGN PATENTS

| | | | |
|---|---|---|---|
| 1,010,999 | 11/1965 | Great Britain | 260—374 |

OTHER REFERENCES

Heyna, Chemistry of Natural and Synthetic Coloring Matter, New York, Academic Press Inc. (1962) pp. 473–476 and 481–483.

LORRAINE A. WEINBERGER, Primary Examiner

E. J. SKELLY, Assistant Examiner

U.S. Cl. X.R.

8—40; 260—372, 562 A, 575